Patented Feb. 20, 1923.

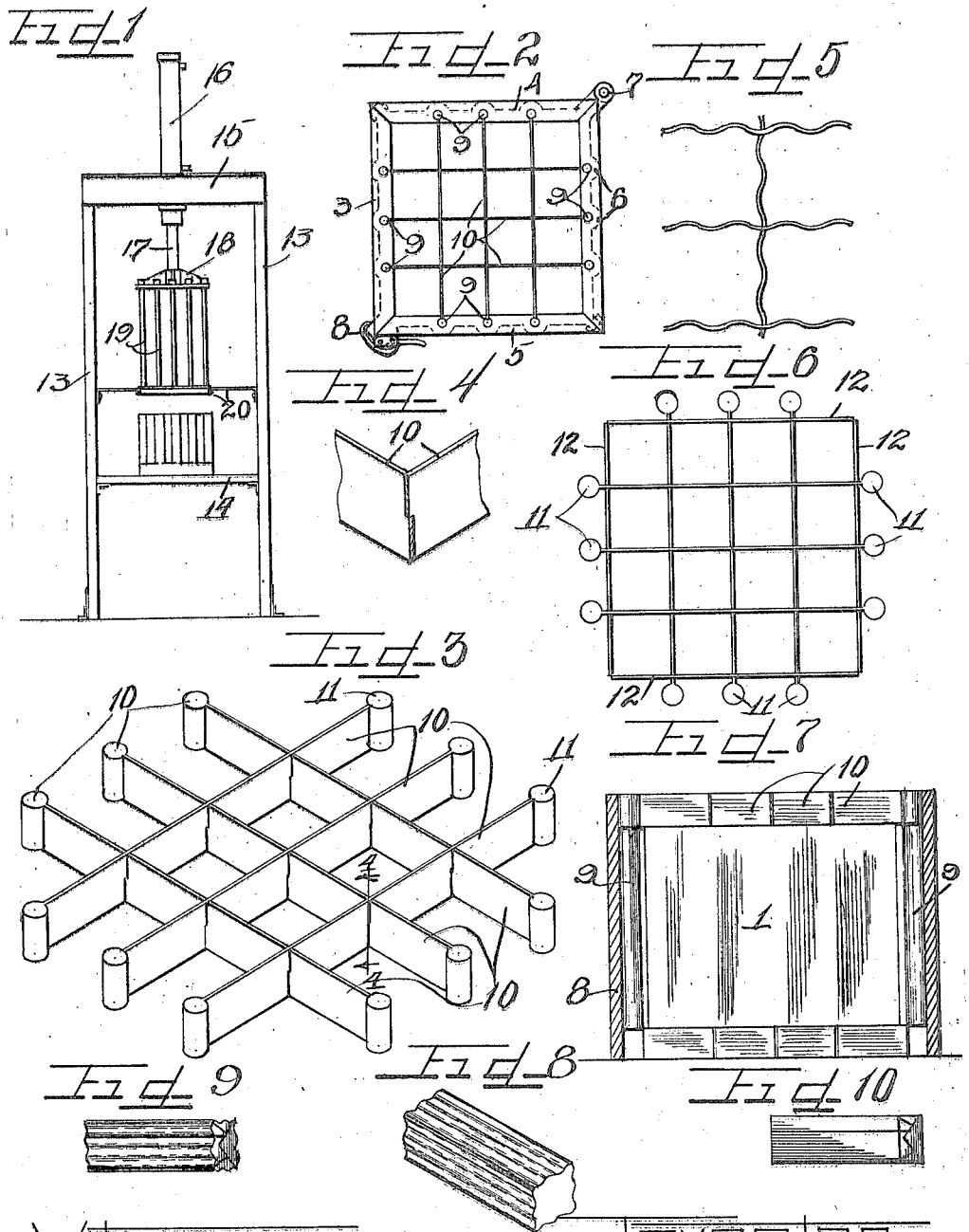

1,445,787

UNITED STATES PATENT OFFICE.

JULIUS R. MEYERS, OF EVANSTON, ILLINOIS.

CHEESE-CUTTING MECHANISM.

Application filed August 25, 1921. Serial No. 495,257.

*To all whom it may concern:*

Be it known that I, JULIUS R. MEYERS, a citizen of the United States, and a resident of the city of Evanston, in the county of Cook and State of Illinois, have invented certain new and useful Improvements in a Cheese-Cutting Mechanism; and I do hereby declare that the following is a full, clear, and exact description of the same, reference being had to the accompanying drawings, and to the numerals of reference marked thereon, which form a part of this specification.

This invention relates to cheese cutting mechanism in which a block of cheese is simultaneously cut into a number of smaller blocks for further treatment.

It is an object of this invention to provide a novel form of cutting mechanism that produces uniform blocks and which is properly guided and provided with trimmers.

It is a further object of this invention to provide a cutter for producing wavy surface contours on the cut blocks for filling purpose to facilitate the rinding process, to which the smaller cut blocks of cheese are later subjected.

With these and other objects in view, which will be more apparent in the following description and disclosures in the drawings, this invention comprises the novel mechanism and structure hereinafter described and more specifically pointed out in the appended claims.

In the accompanying drawings, which illustrate the preferred embodiments of my invention, and in which similar reference numerals refer to similar features in the different views:

Figure 1 is a front elevation of the cutting press.

Figure 2 is a top view of the cutter guiding box with the cutter in position.

Figure 3 is a perspective view of one form of cutter.

Figure 4 is a section on the line 4—4 of Figure 3.

Figure 5 is a top view of a modified form of cutter.

Figure 6 is a top view of the cutter with the trimmers attached.

Figure 7 is a section through the cutter guiding box illustrating certain features.

Figure 8 is a perspective view of a block of cheese cut with wavy formation.

Figure 9 is a perspective view of a wrapped piece of cheese with wavy contour.

Figure 10 is an elevational view of the block of cheese shown in Figure 9 after the fusing process.

As shown on the drawings:

In referring to the drawings, which illustrate one form of mechanism that I have devised, it will be observed that the block of cheese 1 is placed within the cutter guide which comprises a grooved walled structure surrounding the block of cheese to be cut. The form of the cutter guide should be shaped to conform to the desired block of cheese. In the present instance, in which substantially square blocks of uncut cheese are illustrated, the cutter guide box presents the appearance of an open box-like structure having the walls 3 and 4 rigidly secured at their adjacent ends and the walls 5 and 6 also rigidly secured at their adjacent ends; the adjoining ends of the walls 4 and 6 being provided with a hinge connection 7, while the adjacent ends of the walls 3 and 5 are latched together by some appropriate means which may be the simple latch 8 secured to one wall and latched to a projection on the other wall. Thus the guide box is composed of two sections hinged together. By unlatching the walls 3 and 5, the box-like structure may be opened by swinging the rigidly joined walls outwardly upon the hinge connection, as is obvious. The top and bottom of the guide box structure are open, and the upper portion may be provided with a narrow outwardly extending flange, as shown in Figure 2, if desirable. The inner walls of the guide box are provided with a number of spaced grooves 9 having constricted open necks corresponding to the number and spacing of the cutter blades 10 which are provided with guide heads 11 in the form of upright cylindrical members which fit in the said grooves. These grooves extend through the guide box so that the cutter can pass therethrough.

The cutter is preferably made by uniting a plurality of crossed blades so arranged as to provide the desired form of cut cheese desired. In the drawing, the blades are shown crossed at right angles and all equally spaced to cut equal pieces of cheese in the form of substantial squares, but it is to be understood that different forms may be produced by different arrangement of the blades forming the cutter, as is obvious. The blades are provided with interfitting parts for the purpose of uniting or joining the same as by cutting slits substantially half way through each blade at the desired points, so that each slit will receive the uncut portion in line with the slit of the crossed blade at that particular point. The length of the blades and the spacing thereof should be designed according to the cheese to be cut and the guide box therefor will be accordingly proportioned and designed so that the large block of cheese will readily fit therein, but leaving enough space therearound to accommodate the trimmer blades 12, shown in Figure 6, which may be used if desired to trim the outer surfaces adjacent the guide box. The cutting blades may be smooth, as shown in Figures 2, 3 and 6, or they may be of wavy form, as shown in Figure 5.

The blocks of cheese that are cut by my cutter of wavy form naturally have wavy surfaces, and in the process of fusing the surfaces of these blocks, they are first wrapped in a suitable wrapper, as shown in Fig. 9, and placed in a press, the walls of which are heated, and slight pressure is then applied as illustrated in my copending application Serial No. 488,869. During this operation, the crests will spread and fuse over the surface, filling any blow holes, cavities, or irregularities in the surfaces of the cheese, providing a fused protective coating or surface on the cheese, and further the wrapper will be fused to the surfaces of the cheese preventing the atmospheric elements from attacking it and forming a hard objectionable rind on the surfaces of the cheese, and the fused surfaces of the cheese will thus be preserved in a good edible condition with substantially smooth surfaces, as shown in Figure 10.

For the purpose of cutting the cheese, a cutting press is preferably used to force the cutter through the block of uncut cheese. In Figure 1, I have illustrated one form of cutting press which may be used, the same consisting of an upright frame 13 having a cheese supporting platform 14 and a top member 15 in which a steam or hydraulic cylinder 16 is supported for operating the plunger 17, which is provided with the usual piston operating in the cylinder. The plunger mechanism consists of a head 18 which has a number of screw threaded bosses in which studs 19 are secured. The number of studs preferably corresponds to the number of guides on the cutter, and they are so spaced that their lower ends come into contact with the cutter guides on the downward movement of the plunger. In order to keep the lower ends of the rods properly spaced, a ring member 20 is fastened to the posts 13 and guides the studs as they are descending through the guide box in the act of driving the cutter through the cheese.

The operation is as follows:

In using my apparatus, a base composed of spaced wooden blocks 1 or the like is arranged upon the platform 14, the spaces between the blocks being adapted for allowing the knives to pass therein. The block of cheese to be cut is supported upon these blocks surrounded by the guide box. The cutter is placed upon the top of the cheese with the guides 11 in the grooves 9. The plunger 17 may then be operated downwardly, the studs 19 engaging the guides 11 which project beyond the sides and ends of the cheese, for forcing the cutter through the cheese. The construction of the guide box is such that the cutter can be advanced completely through the cheese and into the blocks 1, and in such position the box can be unlatched and removed from its position around the cheese, as is obvious.

It should be particularly noted that my cutter comprises blades which are rigid and can be provided with a fine cutting edge and that it is adapted for also trimming the exposed sides and ends of the cheese, and that the same may comprise blades of wavy formation. It is characteristic of my cutter that it is provided with efficient rounded guides that operate in substantially circular grooves having merely open necks for receiving the blades, thus preventing lateral play or shifting of the cutter. It should also be noted that my cutter can be readily constructed and assembled.

I am aware that numerous details of construction may be varied through a wide range without departing from the principles of this invention, and I therefore do not purpose limiting the patent granted otherwise than necessitated by the prior art.

I claim as my invention:

1. A cheese cutting mechanism consisting of an open ended box comprising two sections hinged together, adapted for receiving a block of cheese to be cut and having grooves in the inner walls thereof, a cutter comprising a plurality of crossed blades having guides at their outer ends slidably fitting in said grooves, and means for exerting pressure on said guides for operating said cutter.

2. In a cheese cutting mechanism, a cutter comprising a plurality of blades having interfitting parts, connected at angles to each other, and having enlarged guiding portions at their ends.

3. In a cheese cutting mechanism, a cutter having enlarged guides at its ends, and a reciprocal device for operating said cutter comprising a head having studs adapted for engaging said guides.

In testimony whereof I have hereunto subscribed my name in the presence of two subscribing witnesses.

JULIUS R. MEYERS.

Witnesses:
 CHARLES W. HILLS, Jr.,
 JAMES M. O'BRIEN.